(12) United States Patent
Bush

(10) Patent No.: US 12,291,331 B2
(45) Date of Patent: May 6, 2025

(54) AIRCRAFT

(71) Applicant: NEEDWOOD ENGINEERING CONSULTING LIMITED, Dorchester (GB)

(72) Inventor: James Henry Bush, Barton Under Needwood (GB)

(*) Notice: Subject to any disclaimer, the term of this patent is extended or adjusted under 35 U.S.C. 154(b) by 705 days.

(21) Appl. No.: 17/310,677

(22) PCT Filed: Nov. 5, 2019

(86) PCT No.: PCT/GB2019/053133
§ 371 (c)(1),
(2) Date: Aug. 17, 2021

(87) PCT Pub. No.: WO2020/169940
PCT Pub. Date: Aug. 27, 2020

(65) Prior Publication Data
US 2022/0081121 A1    Mar. 17, 2022

(30) Foreign Application Priority Data

Feb. 19, 2019    (GB) ..................... 1902269

(51) Int. Cl.
*B64C 3/50*    (2006.01)
*B64C 9/38*    (2006.01)
*B64C 29/00*    (2006.01)

(52) U.S. Cl.
CPC ............ *B64C 3/50* (2013.01); *B64C 29/0025* (2013.01); *B64C 9/38* (2013.01)

(58) Field of Classification Search
CPC ............ B64C 29/0066; B64C 29/0025; B64C 29/005; B64C 27/26; B64C 9/38
See application file for complete search history.

(56) References Cited

U.S. PATENT DOCUMENTS 1,737,210 A * 11/1929 Weltner .............. B64C 29/0025
                                              244/12.1
2,115,285 A * 4/1938 Ruderman .......... B64C 29/0025
                                              244/12.1
(Continued)

FOREIGN PATENT DOCUMENTS

CN      108045573 A * 5/2018 ............. B64C 27/26
GB      2267265 A    12/1993
(Continued)

OTHER PUBLICATIONS

Translation CN-108045573 (Year: 2018).*

*Primary Examiner* — Nicholas McFall
*Assistant Examiner* — Marisa V Conlon
(74) *Attorney, Agent, or Firm* — LAW OFFICES OF MICHAEL L. WISE, LLC

(57) ABSTRACT

An aircraft comprising at least one propulsion unit configured to propel the aircraft in a first direction and at least one further propulsion unit configured to propel the aircraft in a second direction substantially opposite to the first direction. The aircraft also includes at least one wing, wherein the at least one propulsion unit is mounted in front of the leading edge of the at least one wing, such that the air downstream of the at least one propulsion unit flows around the at least one wing to provide lift and a longitudinal thrust in the first direction. The at least one further propulsion unit is configured to provide a longitudinal thrust in the second direction.

20 Claims, 15 Drawing Sheets

(56) References Cited

U.S. PATENT DOCUMENTS

| | | | | |
|---|---|---|---|---|
| 2,415,710 | A * | 2/1947 | Smith | B64C 23/005 244/113 |
| 5,195,702 | A * | 3/1993 | Malvestuto, Jr. | B64C 19/00 244/206 |
| 5,244,167 | A * | 9/1993 | Turk | B64C 19/00 244/23 B |
| 6,655,631 | B2 * | 12/2003 | Austen-Brown | B64D 25/00 244/12.4 |
| 7,823,826 | B1 * | 11/2010 | Lewis | B64C 29/005 244/12.5 |
| 10,370,100 | B2 * | 8/2019 | Rothhaar | B64C 29/0033 |
| 2005/0230519 | A1 * | 10/2005 | Hurley | B64C 29/0033 244/7 C |
| 2006/0186261 | A1 | 8/2006 | Unzicker | |
| 2017/0197700 | A1 * | 7/2017 | Wainfan | B64C 9/38 |

FOREIGN PATENT DOCUMENTS

| | | |
|---|---|---|
| RU | 2670357 C1 | 10/2018 |
| RU | 2670361 C1 | 10/2018 |
| WO | 2015019255 A1 | 2/2015 |
| WO | 2017072519 A1 | 5/2017 |

* cited by examiner

AIRCRAFT

This invention concerns an aircraft, and particularly an aircraft capable of vertical and/or short take-off and landing (V/STOL).

Aircraft capable of taking off and landing vertically can be used to access areas where there are no full length runways, and can therefore provide improved versatility relative to traditional winged aircraft. One such vehicle is a helicopter. Helicopters include horizontal rotors to provide lift, which can be inclined to enable movement of the helicopter in the horizontal plane. However, in general, helicopters are only able to travel at low speeds when compared to winged aircraft, as the rotors must produce both the lift and forward thrust.

A number of fixed-wing aircraft that can carry out vertical and/or short take-off and landing (V/STOL) have been proposed that enable travel at higher speeds relative to helicopters. The wings of these fixed-wing aircraft provide the lift, so that the forward propulsion units, for example propellers, are mostly used to provide forward thrust during flight, enabling travel at higher speeds. For instance, the Ryan XV-5 incorporates downwardly facing high speed fans into the wings to provide lift during take-off and landing. These high speed fans are though relatively expensive, and the wings themselves do not contribute towards the lift during take-off and landing. An additional example of a V/STOL aircraft with wings is the Hawker Harrier, which directs the exhaust jet of the aircraft's jet engine downwards using rotatable exhausts to provide lift. The Boeing Osprey also includes rotatable propulsion units, in the form of propellers that provide lift when directed vertically during take-off, and provide forward thrust when directed forward once airborne. Such aircraft are of relatively complex construction when compared to traditional aircraft, as the jet engines or propellers must be reoriented in flight, and are therefore relatively expensive.

The standard axes of fixed-wing aircraft used herein are well known. These axes move with the aircraft, are perpendicular to each other and intersect at the aircraft's centre of gravity. The longitudinal axis of a fixed-wing aircraft extends in the direction from the trailing edge of the wing to the leading edge of the wing. Rotation about the longitudinal axis is described as roll. The lateral axis extends from wingtip to wingtip, and rotation about this axis is described as pitch. The vertical axis is normal to the geometric plane formed by the longitudinal and lateral axes, parallel to the aircraft's primary lift vector and, when in level flight, its weight vector. Rotation about the vertical axis is described as yaw.

For example, in a conventional aircraft including a fuselage and two straight wings extending perpendicular to the fuselage from either side of the fuselage, the longitudinal axis extends through the fuselage from nose (i.e. the front of the aircraft) to tail. The lateral axis extends parallel to the wings, and the vertical axis extends from the top to the bottom of the aircraft. A forward direction is defined by the longitudinal direction in which the aircraft is primarily configured to travel during flight.

The term propel used herein is to be understood as providing a force or thrust, and does not necessarily imply movement in the direction of the force or thrust.

The term wing used herein is to be understood as a rigid member configured to provide lift or downforce when an airflow flows around it. The wing may include an aerofoil section.

According to a first aspect of the invention there is provided a fixed-wing aircraft comprising: at least one propulsion unit configured to propel the aircraft in a first direction; at least one further propulsion unit configured to propel the aircraft in a second direction substantially opposite to the first direction; and at least one wing, wherein the at least one propulsion unit is mounted in front of the leading edge of the at least one wing, such that the air downstream of the at least one propulsion unit flows around the at least one wing to provide lift and a longitudinal thrust in the first direction, and the at least one further propulsion unit is configured to provide a longitudinal thrust in the second direction.

The aircraft may be configured such that the at least one further propulsion unit is spaced from the leading edge of the at least one wing, to prevent the air downstream of the at least one further propulsion unit flowing around the at least one wing. The at least one further propulsion unit may be mounted to the lateral outer end of the at least one wing.

The at least one further propulsion unit may be configured to provide a longitudinal thrust in the second direction at a magnitude substantially equal to the magnitude of the longitudinal thrust in the first direction provided by the at least one propulsion unit during take-off or landing, such that the aircraft does not accelerate longitudinally during take-off or landing, and thereby enables the aircraft to take-off and land vertically.

The at least one propulsion unit and the at least one further propulsion unit may be configured to provide thrust in the first and/or second directions only.

The aircraft may further comprise at least one further wing, wherein the at least one further wing may be mounted in the first direction relative to the at least one further propulsion unit, such that the air downstream of the at least one further propulsion unit flows around the at least one further wing to generate lift, when the at least one further propulsion unit is providing a longitudinal thrust in the second direction.

The at least one further wing in may include an adjustable deflection surface at the furthermost part of the at least one further wing in the first direction and an adjustable deflection surface at the furthermost part of the at least one further wing in the second direction, which are configured to be selectively lowered in order to configure the at least one further wing to produce lift from the prevailing airflow flowing around the at least one further wing.

The aircraft may be configured such that the at least one further propulsion unit is spaced from the leading edge of any wings, to prevent the air downstream of the at least one further propulsion unit flowing around any wings, and thereby the air downstream of the at least one further propulsion unit produces substantially no lift.

The at least one propulsion unit may include any of: a propeller, a turboprop, a jet engine, a fan, or a combination thereof. The at least one propulsion unit may include a propeller or fan and a contra-rotating propeller or fan configured to rotate about the same axis as the propeller or fan but in an opposite direction to the propeller or fan. Possibly, the at least one further propulsion unit does not include a contra-rotating propeller or fan.

The at least one further propulsion unit may include any of: a propeller, a turboprop, a jet engine, a fan, a rocket, or a combination thereof. The at least one further propulsion unit may include a propeller or fan and a contra-rotating propeller or fan configured to rotate about the same axis as the propeller or fan but in an opposite direction to the propeller or fan.

The aircraft may include a divider to separate the airflows from the at least one propulsion unit and the at least one further propulsion unit. The divider may be a generally upstanding panel which is provided on the at least one wing between the at least one propulsion unit and the at least one further propulsion unit to separate the airflows from the respective propulsion units.

The aircraft may be configured to provide reduced or zero thrust from the at least one further propulsion unit once airborne.

The aircraft may be configured to reverse the direction of thrust provided by the at least one further propulsion unit once airborne, such that the at least one further propulsion unit provides a thrust in the first direction.

The at least one further propulsion unit may be rotatably mounted to the remainder of the aircraft such that once airborne, the at least one further propulsion unit can be rotated to provide a thrust in the first direction.

A chord of the at least one wing at a first point along the length of the at least one wing may be substantially parallel to a chord of the at least one wing at all other points along the length of the at least one wing.

The aircraft may comprise a fuselage and two wings, with a wing extending from each side of the fuselage. The fuselage may be elongate, and the length dimension of the fuselage may define a longitudinal axis. The at least one further propulsion unit may comprise two further propulsion units, with the two further propulsion units possibly being mounted symmetrically about the longitudinal axis. The chord at the first point along the length of the two wings may be substantially parallel to the longitudinal axis.

The at least one further propulsion unit may be provided within a channel in the fuselage. The divider may be the fuselage of the aircraft. An additional further propulsion unit may be provided at the lateral outer end of each of the two wings.

The aircraft may include at least one tail wing mounted at the furthermost part of the aircraft in the second direction and at least one tail propulsion unit mounted in front of the leading edge of the at least one tail wing, such that the air downstream of the at least one tail propulsion unit flows around the at least one tail wing to provide lift or downforce and a thrust in a first direction.

The at least one tail wing may include at least one adjustable flap mounted on the trailing edge of the at least one tail wing, which flap may be adjustable such that the amount of lift or downforce caused by the air flow from the at least one tail propulsion unit can be adjusted.

The at least one further propulsion unit may be configured to provide a longitudinal thrust in the second direction at a magnitude substantially equal to the magnitude of the longitudinal thrust provided by the at least one propulsion unit and the at least one tail propulsion unit during take-off or landing, such that the aircraft does not accelerate longitudinally during take-off or landing, and thereby enables the aircraft to take-off and land vertically.

According to a second aspect of the invention there is provided a method of controlling an aircraft according to any of the preceding paragraphs, the method comprising: activating the at least one propulsion unit, such that the airflow from the at least one propulsion unit flows around the at least one wing to provide lift and a longitudinal thrust in the first direction; activating the at least one further propulsion unit to provide a longitudinal thrust in the second direction that opposes the longitudinal thrust in the first direction provided by the at least one propulsion unit; and taking off using the lift, such that the aircraft is no longer in contact with the ground.

The taking off may include configuring the at least one further propulsion unit to provide a longitudinal thrust in the second direction at a magnitude substantially equal to the magnitude of the longitudinal thrust in the first direction such that the aircraft does not accelerate in the horizontal plane.

The method may further comprise: once the aircraft is no longer in contact with the ground, reducing the thrust provided by the at least one further propulsion unit.

The method may further comprise: once the aircraft is no longer in contact with the ground, reversing the direction of the thrust provided by the at least one further propulsion unit, such that the at least one further propulsion unit provides thrust in the first direction.

According to a third aspect of the invention there is provided a method of landing an aircraft according to one or more of the proceeding paragraphs, the method comprising: increasing the longitudinal thrust provided by the at least one further propulsion unit in the second direction, such that the longitudinal velocity of the aircraft in the first direction decreases; whilst the longitudinal velocity of the aircraft in the first direction decreases, increasing the longitudinal thrust in the first direction provided by the at least one propulsion unit, such that a steady airflow is maintained around the at least one wing; and once the longitudinal velocity of the aircraft in the first direction has been reduced, decreasing the longitudinal thrust in the first direction provided by the at least one propulsion unit, such that the amount of lift generated by the aircraft is reduced, thereby causing the aircraft to descend.

The longitudinal velocity of the aircraft may be reduced to zero.

Embodiments of the present invention will now be described by example only and with reference to the accompanying drawings, in which:—

Figure 12:
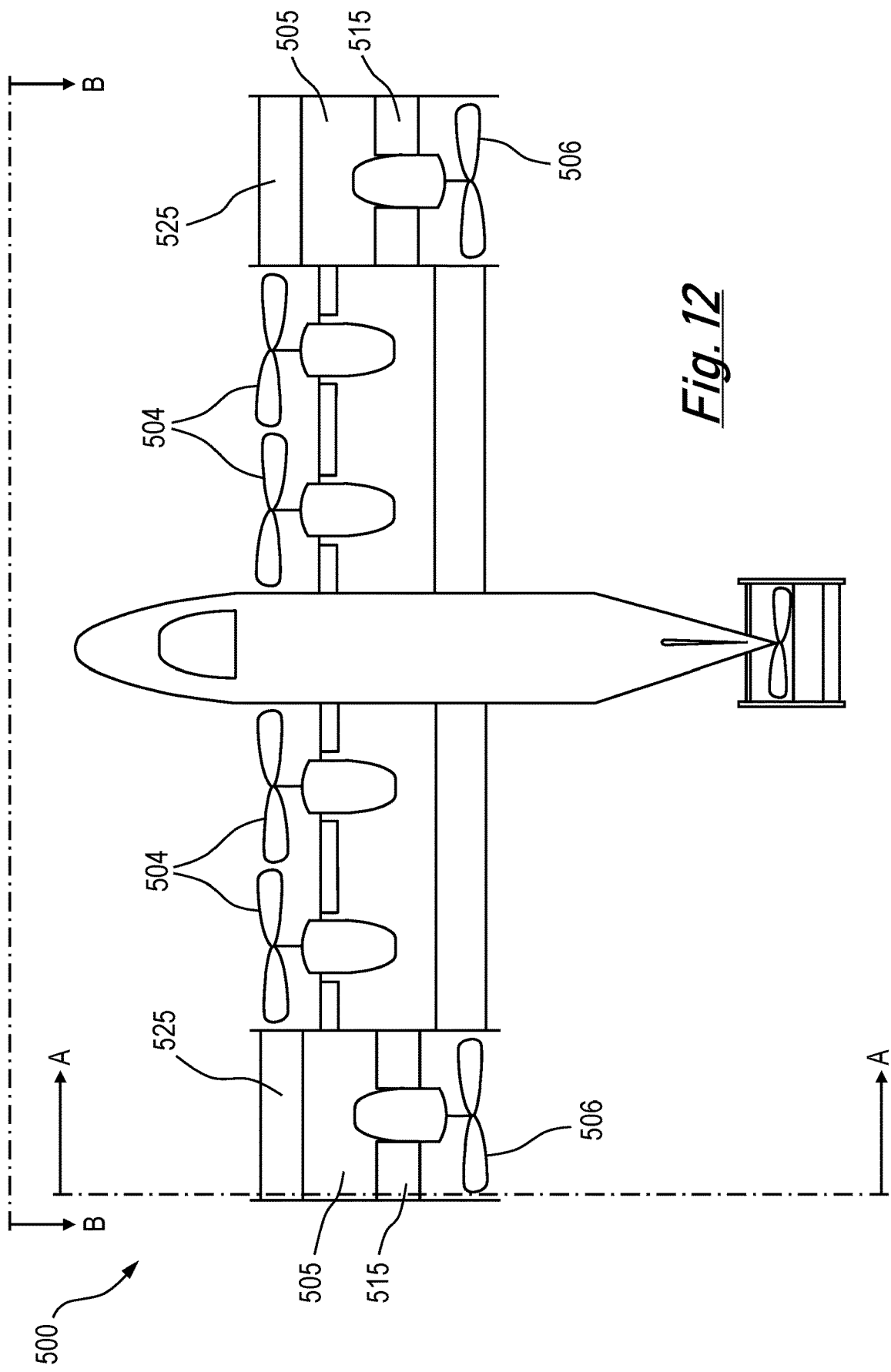
FIG. 12 is a diagrammatic plan view of a fifth aircraft according to the invention.
Figure 13:
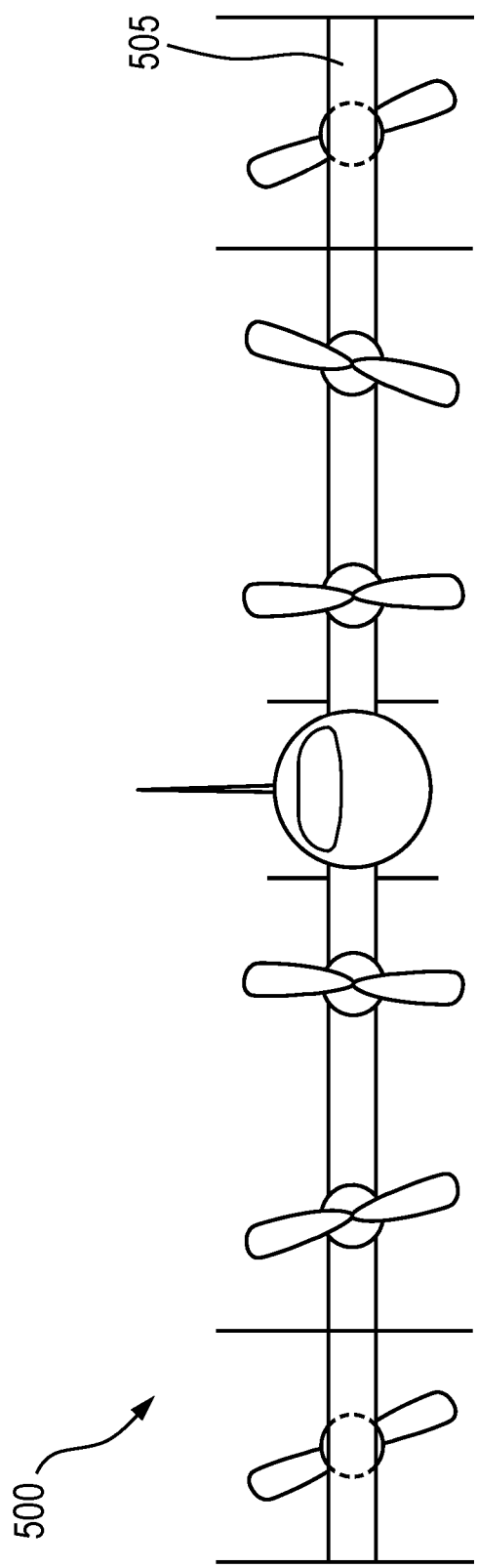
Figure 14:
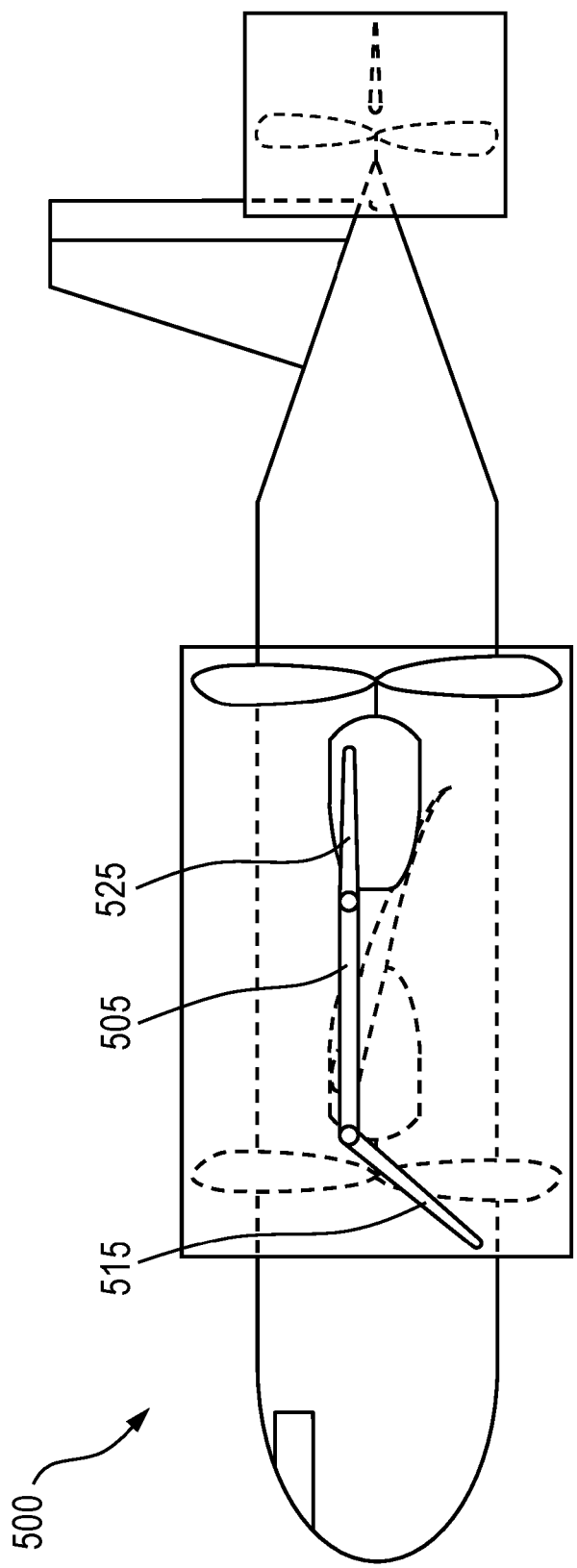
Figure 15:
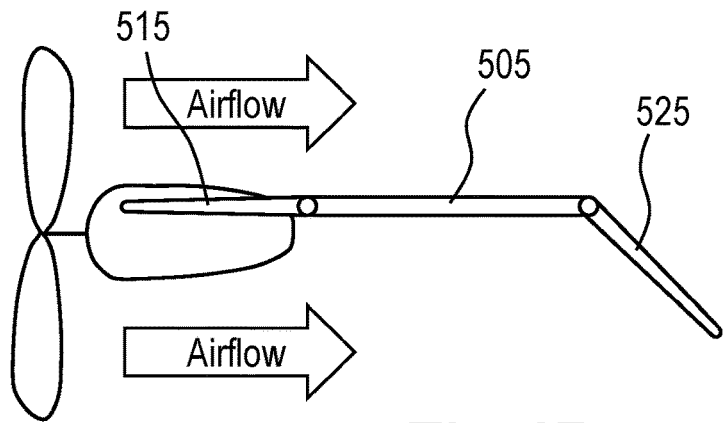
Figure 16:
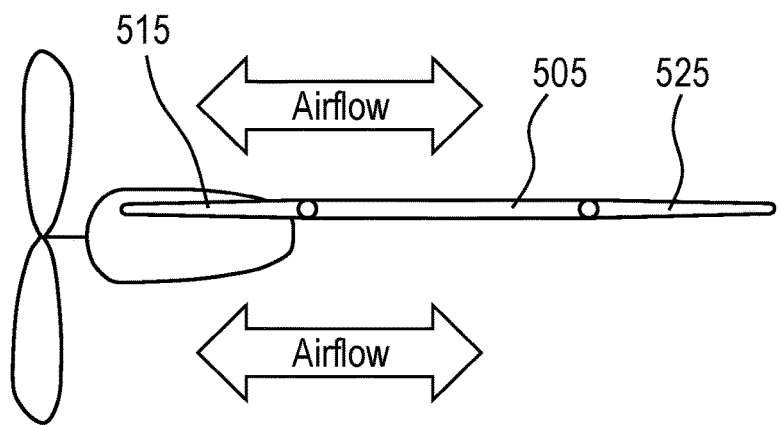
Figure 17:
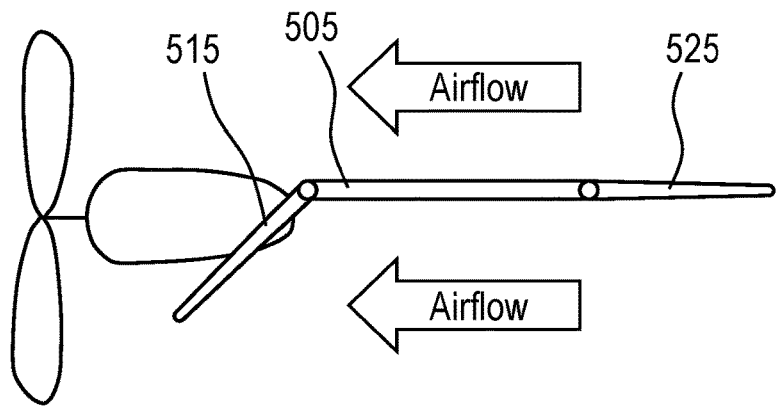
Figure 18:
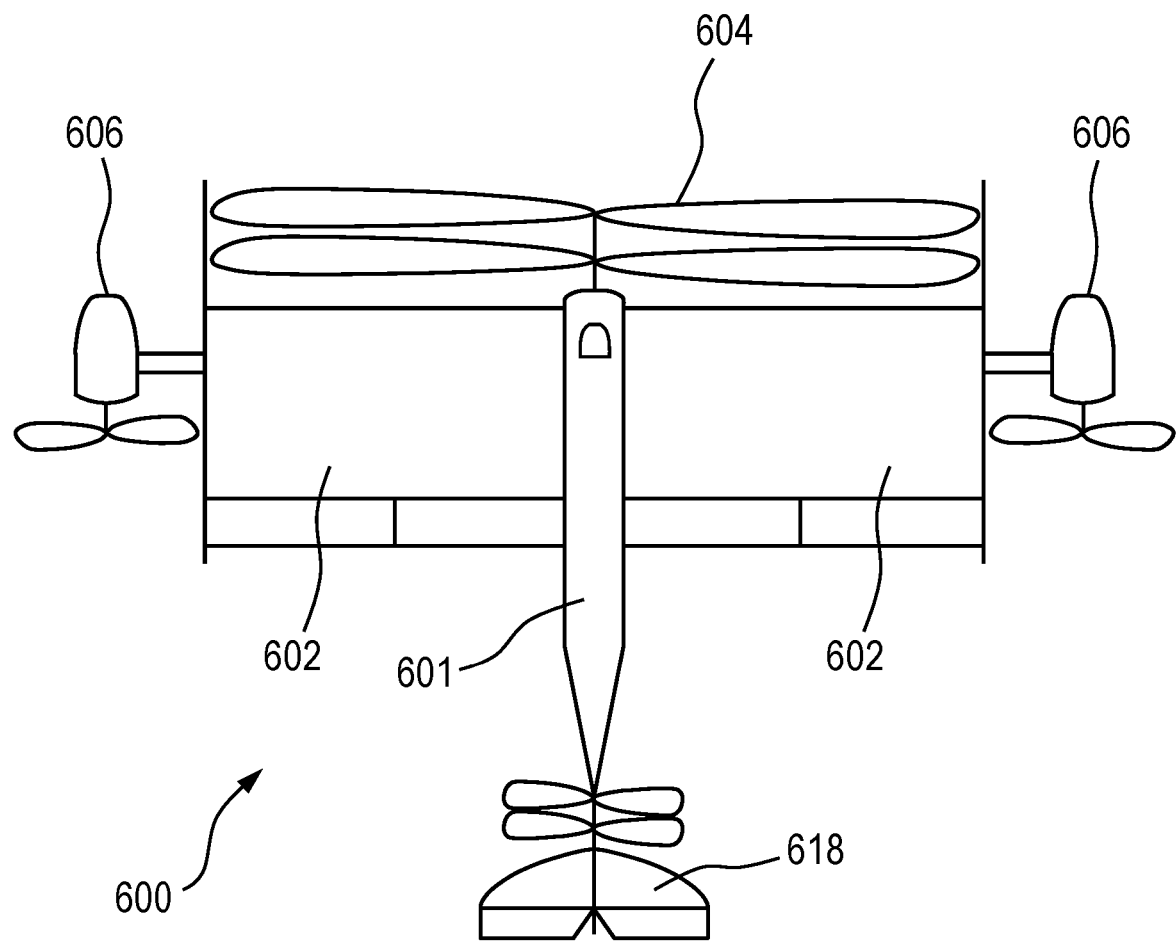

FIG. 13 diagrammatic view along line B-B of the aircraft of FIG. 12;

FIG. 14 cross sectional view along line A-A of the aircraft of FIG. 12, with objects hidden from view shown in broken lines;

FIGS. 15 to 17 are diagrammatic side views of the rearward wing of FIG. 14 with the flaps of the wing in a variety of positions; and FIG. 18 is a diagrammatic plan view of a sixth aircraft according to the invention.

Figure 1:
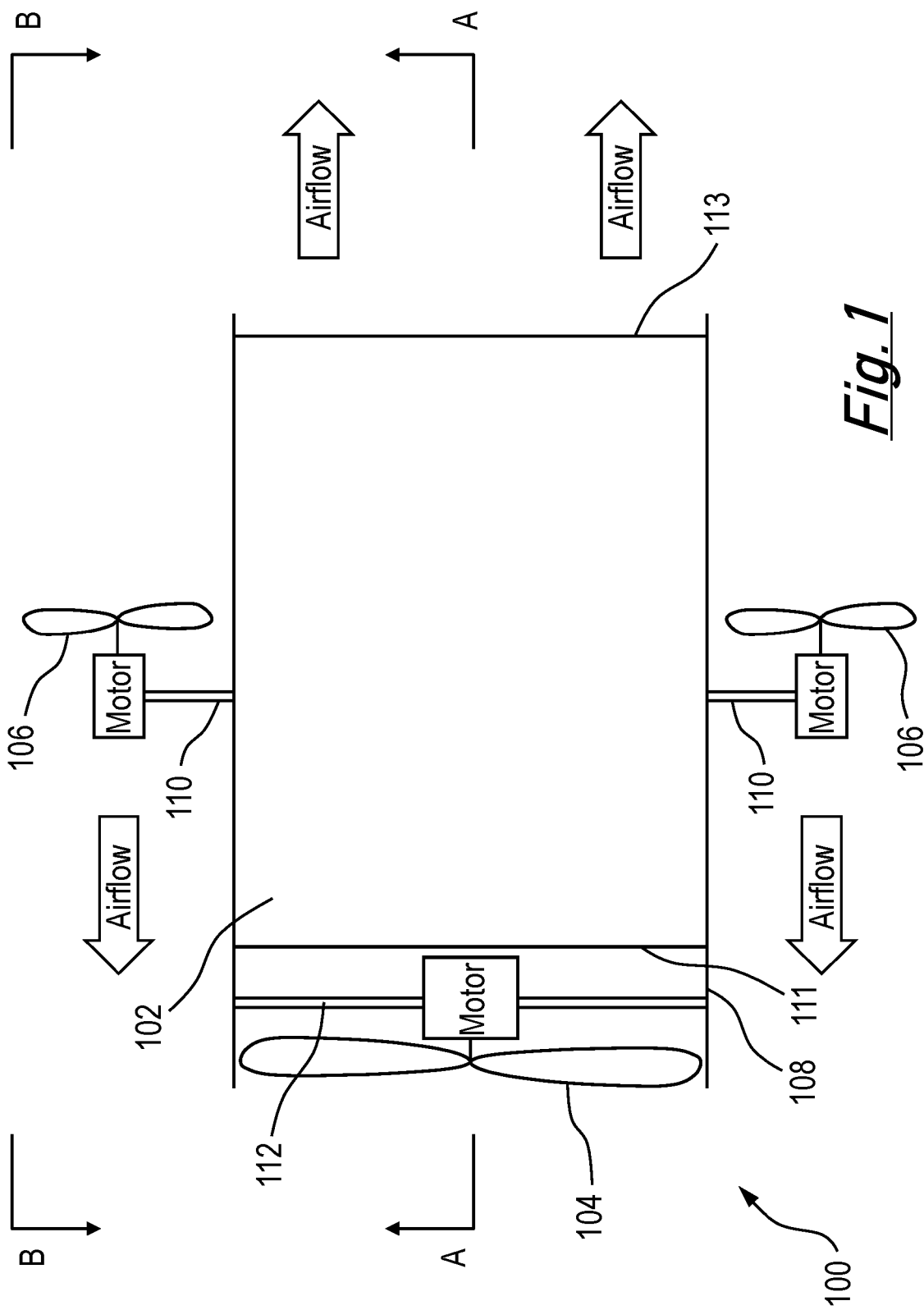
FIG. 1 is a diagrammatic plan view of an aircraft according to the invention.

FIG. 1 shows an aircraft 100 according to the invention. The aircraft 100 includes a wing 102, one (forward) propulsion unit 104 and two further (rearward) propulsion units 106. A propulsion unit is a component of the aircraft that is configured to provide a thrust when activated.

Figure 2:
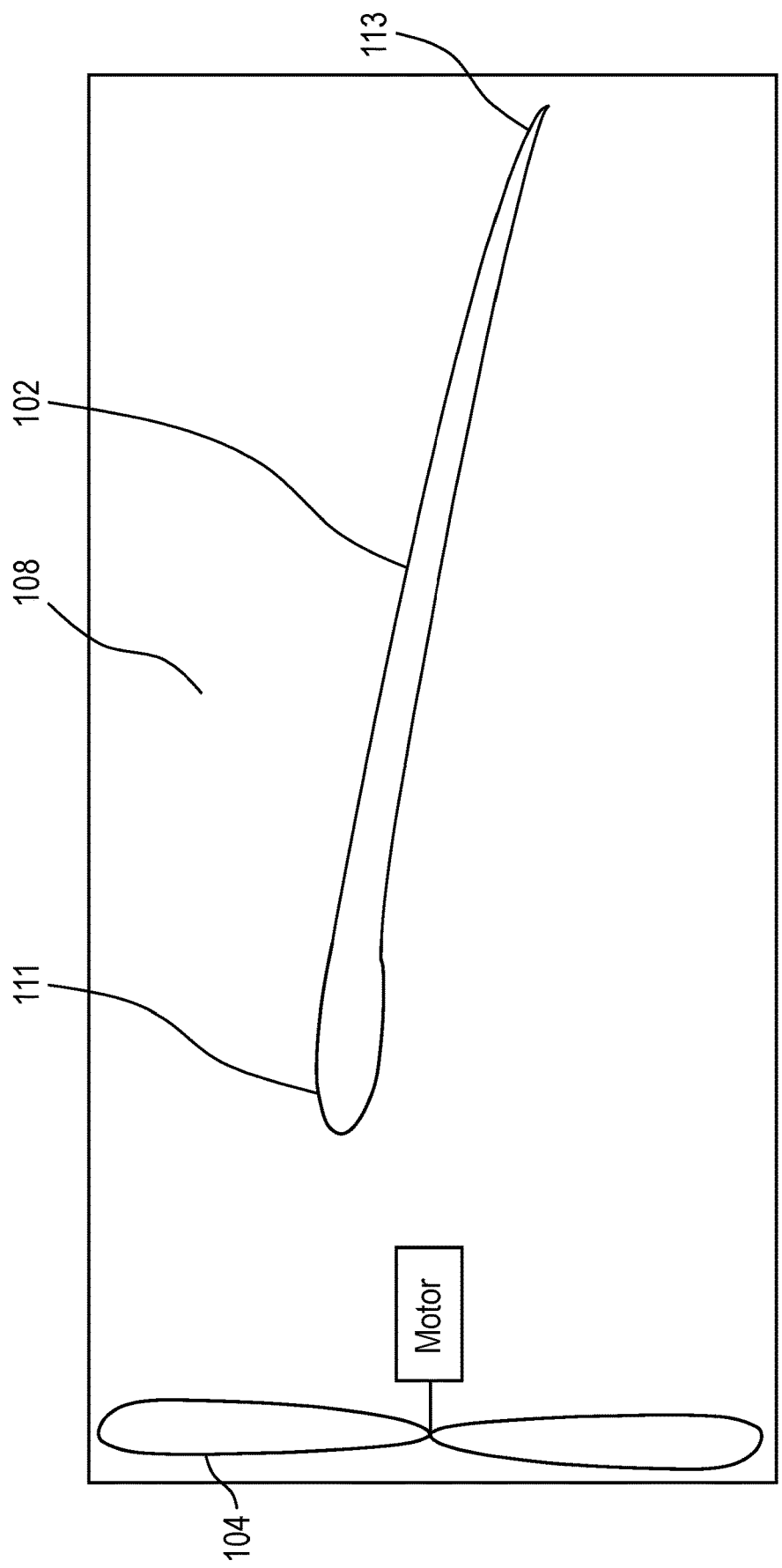
FIG. 2 is a cross sectional view along line A-A of the aircraft of FIG. 1.

The wing 102 has an aerofoil profile to provide lift when air passes the wing 102, as shown in FIG. 2. The aerofoil profile may be a high-lift profile, such as the Selig S1223, which has a relatively large camber. The wing includes a leading edge 111, which is upstream of a trailing edge 113 as is conventional. The chord (i.e. an imaginary straight line joining the leading edge and trailing edge) at a first point along the length of the wing 102 is substantially parallel to the chord at all other points along the length of the wing 102.

First and second directions are referred to herein. The second direction is substantially opposite to the first direction. The first direction may, for example, be a forward direction and is hereafter referred to as such. The second direction may, for example be a rearward direction and is hereinafter referred to as such. References to a forward propulsion unit are to a propulsion units configured to propel the aircraft in the first direction. References to a rearward propulsion unit are to a (further) propulsion unit configured to propel the aircraft in the second direction. A wing where the leading edge faces in the first direction is described herein as a wing, and a further wing where the leading edge faces in the second direction is described herein as a rearward wing.

The forward propulsion unit 104 is configured to propel the aircraft 100 in a forward longitudinal direction. Propulsion units such as propellers operate in a forward (normal) mode when flying, but are also sometimes able to operate in a reverse mode, which may be used for instance when reversing the aircraft on the ground. The forward propulsion unit 104 being configured to propel the aircraft 100 in a forward longitudinal direction means that it is arranged to be able to provide at least as much thrust in a forward direction when in the forward mode, as in a rearward direction when in a reverse mode. For instance, a forward propulsion unit that is a jet engine would be oriented such that the intake is towards the front of the aircraft relative to the exhaust, in order to primarily provide forward thrust to the aircraft. A further example would be a forward propulsion unit that is a propeller engine. The propeller would be towards the front of the aircraft relative to the motor so that when flying in a forwards direction, clean air can enter the propeller and provide improved performance when operating in a forward direction relative to a rearward direction.

The forward propulsion unit 104 is mounted at a position in front and upstream of the leading edge of the wing 102, as shown in FIG. 2 such that the air downstream of the forward propulsion unit 104 flows around the wing 102 to provide lift.

It is to be understood that the forward thrust provided by forward propulsion unit 104 referred to herein refers to the thrust provided by the forward propulsion unit 104 once the airflow from the forward propulsion unit 104 has passed the wing 102, i.e. once the wing 102 has diverted the airflow from the forward propulsion unit 104 to provide both lift and the forward thrust. This also applies where a rearward wing is positioned in front of a rearward propulsion unit.

The forward propulsion unit 104 shown in FIG. 1 is a propeller powered by a motor. In other examples of the invention, the forward propulsion unit may be for instance a turboprop, a jet engine or a fan.

Where the forward propulsion unit 104 is a propeller, turboprop or a fan, the forward propulsion unit may also include a further contra-rotating propeller or fan configured to rotate about the same axis as the first propeller or fan, but also configured to rotate in the opposite direction to the first propeller or fan. The first propeller or fan alone provides a non-uniform airflow with a rotational component, which reduces the lift provided by the airflow around the wing 102. The contra-rotating propeller or fan can reduce or remove this rotational component of the airflow around the wing 102, and therefore increase the lift generated.

Where the forward propulsion unit 104 is a jet engine, the wing may be provided with structural reinforcement and a heat resistant coating.

The rearward propulsion units 106 are configured to propel the aircraft 100 in a rearward longitudinal direction. Each rearward propulsion unit 106 is mounted on an elongate member 110 that each extend from a lateral end of the wing 102, with one rearward propulsion unit 106 provided on each side of the wing 102. The rearward propulsion units 106 are mounted clear of the wing 102 such that substantially no lift is provided by the airflow directly downstream of the rearward propulsion units 106. The rearward propulsion units 106 are preferably mounted symmetrically about the longitudinal and vertical axes of the aircraft 100, such that a net torque is not produced by the activation of the rearward propulsion units 106, which would cause the aircraft 100 to rotate. The elongate members 110 extending from the lateral end of the wing 102 may be profiled to provide improved aerodynamic performance.

The rearward propulsion units 106 shown in FIG. 1 are each propellers powered by a motor. In other examples of the invention, the rearward propulsion units 106 may be for instance a turboprop, a jet engine, a fan, a rocket, or a combination thereof.

The forward and rearward propulsion units 104, 106 may be fixed in position such that the forward propulsion units 104 and rearward propulsion units 106 are able to provide only forward or rearward thrust. In the example where the rearward propulsion units 106 are propellers, the rearward propulsion units 106 are able to provide rearward thrust by rotating the propellers in a first rotational direction, or forward thrust when the direction of rotation of the propellers is reversed.

Figure 3:
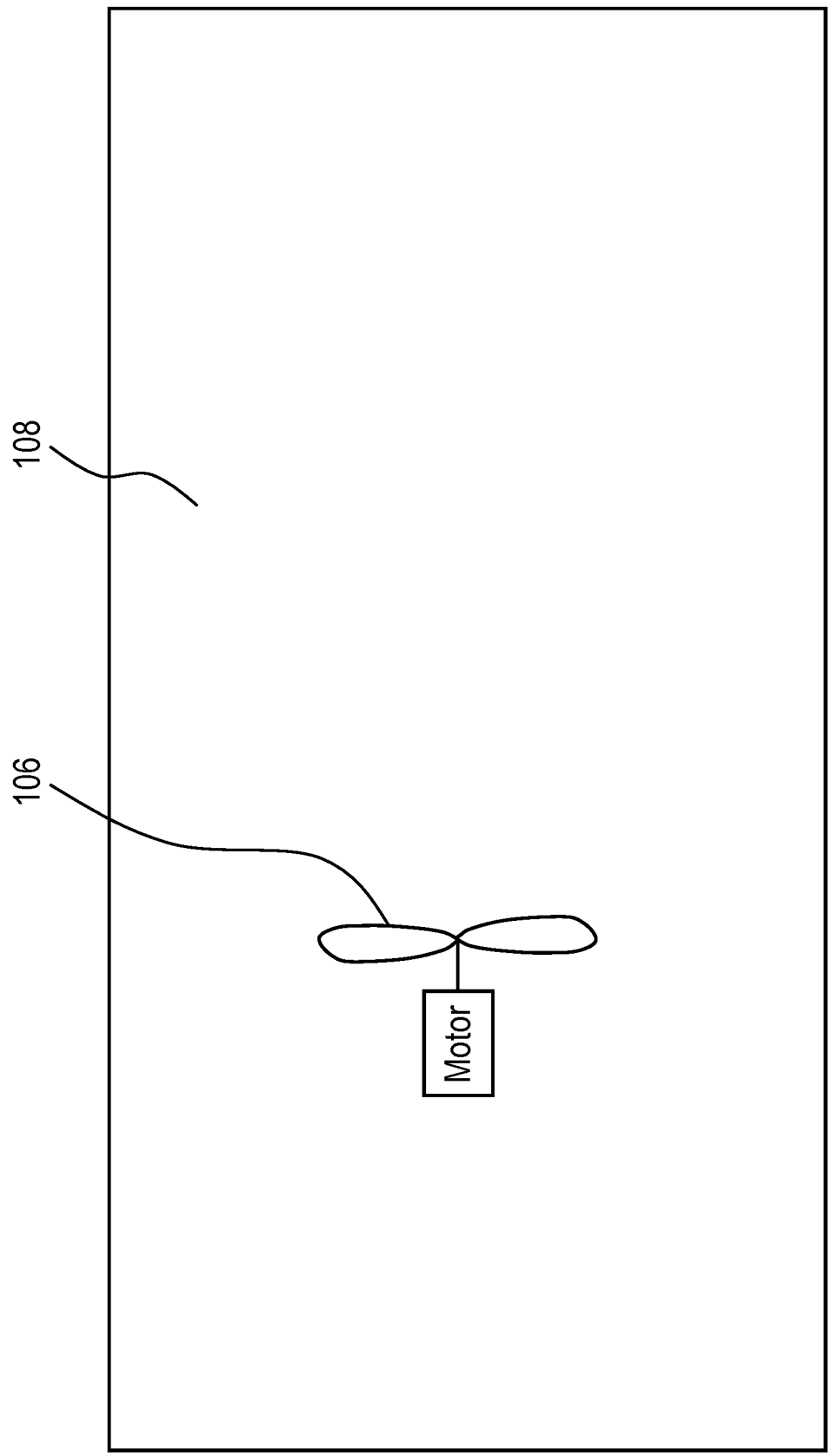
FIG. 3 is a cross sectional view along line B-B of the aircraft of FIG. 1.

A divider 108 is provided on each lateral end of the wing 102 between the forward propulsion unit 104 and the respective rearward propulsion unit 106, which divider 108 may extend outwardly from the wing 102 in both directions in the vertical axis, as shown in FIG. 3. In some embodiments of the invention, dividers may be provided on the lateral outer ends of each wing. The dividers 108 may each be in the form of a panel. The divider 108 provides a barrier between the airflows created by the forward 104 and rearward 106 propulsion units, providing a physical separation between the opposing airflows. This ensures that the airflow flows from the leading edge of the wing to the trailing edge, thus increasing the lift provided by the airflow around the wing 102.

The forward propulsion unit 104 is mounted upstream of the leading edge of the wing on an elongate member 112 extending between the dividers 108 provided on each lateral end of the wing 102.

When taking off, both the forward 104 and rearward propulsion units 106 are activated, to provide both forward and rearward thrust respectively. The forward direction is defined by the side of the wing 102 with the leading edge 111, and the rearward direction is defined by the side of the wing 102 with the trailing edge 113. The airflow generated by the forward propulsion unit 104 flows over the wing 102 to provide lift for taking off. The rearward propulsion units 106 act to counter the forward propulsion provided by the forward propulsion unit 104, which reduces the net forward thrust acting on the aircraft 100. In some embodiments, the thrust provided by the rearward propulsion units 106 matches the forward propulsion provided by the forward propulsion unit 104, such that there is a net zero force acting on the aircraft 100 in a longitudinal direction. This enables the aircraft 100 to take off vertically.

Once the aircraft 100 is no longer in contact with the ground, the thrust provided by the rearward propulsion units 106 can be reduced or reversed, for instance by reversing the direction of rotation of the propellers. This increases the net forward thrust acting on the aircraft 100, and thus the aircraft 100 accelerates in a forward longitudinal direction.

In some embodiments, the rearward propulsion units 106 may be rotatably mounted on the aircraft 100. Once airborne, the rearward propulsion units 106 can be rotated 180 degrees about the lateral axis of the aircraft 100 to a forward direction to provide additional forward thrust.

When preparing to land the aircraft 100, the rearward thrust provided by the rearward propulsion units 106 may be increased to reduce the forward longitudinal velocity of the aircraft. The thrust from the forward propulsion units 104 may be increased to retain a steady airflow around the wing 102 as the aircraft 100 slows, thereby maintaining a steady amount of lift force. In some embodiments, the longitudinal velocity of the aircraft 100 may be reduced to zero so that the aircraft 100 may land vertically.

When landing the aircraft 100, the forward thrust provided by the forward propulsion unit 104 can be reduced, which slows the airflow around the wing 102, thereby reducing the lift acting on the aircraft 100 and initiating downwards motion.

Figure 4:
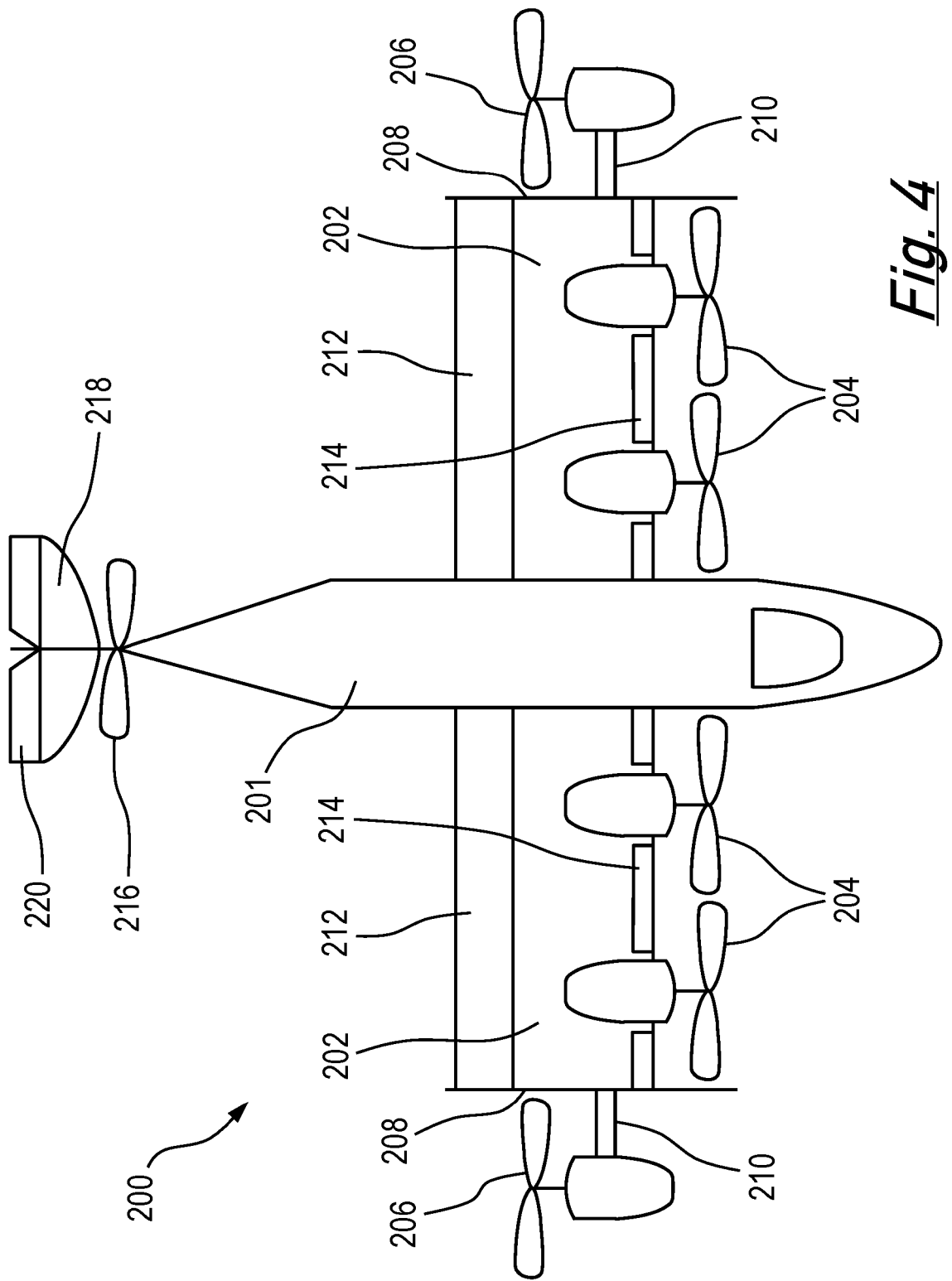
FIG. 4 is a diagrammatic plan view of a second aircraft according to the invention.
Figure 5:
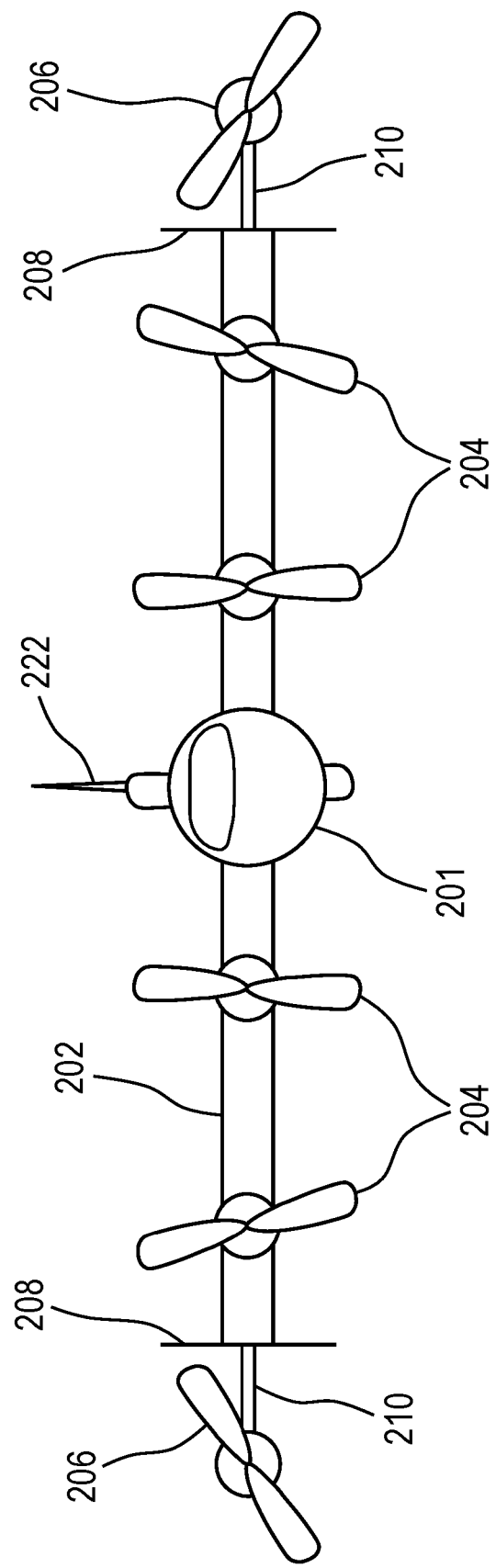
FIG. 5 is a diagrammatic front view of the aircraft of FIG. 4.

FIGS. 4 & 5 show a transport aircraft 200 according to the invention. The transport aircraft includes a fuselage 201 and two wings 202. The wings 202 each extend laterally from a side of the fuselage 201. Mounted on each wing 202 are two forward propulsion units 204 and a single rearward propulsion unit 206. The fuselage 201 is elongate, and the length dimension of the fuselage 201 defines a longitudinal axis.

Each wing 202 has an aerofoil profile to provide lift when air passes around the wing 202. The aerofoil profile may be a high lift profile, such as the Selig S1223, which has a relatively large camber. Each wing 202 includes a leading edge, and adjustable leading edge slats 214 may be provided on the leading edge of the wing 202 to selectively provide a higher coefficient of lift when taking off, flying or landing the aircraft 200. Each wing 202 also includes a trailing edge, which trailing edge may include adjustable trailing edge flaps 212 to selectively provide a higher coefficient of lift when taking off, flying or landing the aircraft 200. The chord (i.e. an imaginary straight line joining the leading edge and trailing edge of a wing)) at a first point along the length of each wing 102 may be substantially parallel to the longitudinal axis. The chord at the first point along the length of each wing 102 may also be substantially parallel to the chord at all other points along the length of the same wing 102.

In this example, the wings 202 are each attached to the fuselage 201 at a proximal end. The lateral outer end of each wing 202 is unattached to the fuselage 201.

The forward propulsion units 204 are configured to propel the aircraft 200 in a forward longitudinal direction. The forward propulsion units 204 are each mounted to one of two wings 202 at a position in front of the leading edge of the respective wing 202, such that the air downstream of the forward propulsion units 204 flows around the respective wing 202 to provide lift. The forward propulsion units 204 shown in FIG. 1 are each propellers powered by a motor. In other examples of the invention, the forward propulsion units 204 may be for instance turboprops, jet engines, fans, or a combination thereof.

Where a forward propulsion unit 204 is a propeller, turboprop or a fan, the forward propulsion unit 204 may also include a further contra-rotating propeller or fan configured to rotate about the same axis as the first propeller or fan, but also configured to rotate in the opposite direction to the first propeller or fan. The first propeller or fan alone provides a non-uniform airflow with a rotational component, which reduces the lift provided by the airflow around the respective wing 202. The contra-rotating propeller or fan can reduce or remove this rotational component of the airflow around the respective wing 202, and therefore increase the lift generated.

Where one of the forward propulsion units 204 is a jet engine, the wing 202 positioned behind the jet engine may be provided with structural reinforcement and a heat resistant coating.

The rearward propulsion units 206 are configured to propel the aircraft 200 in a rearward longitudinal direction. Each rearward propulsion unit 206 is mounted to the respective wing 202 via an elongate member 210 that extends from the lateral outer end of the respective wing 202, such that there is reduced interference between the airflows from the forward 204 and rearward 206 propulsion units. The rearward propulsion units 206 are mounted clear of the respective wing 202 such that substantially no lift is provided by the airflow from the rearward propulsion units 206. In this example, the rearward propulsion units 206 are spaced from the leading edge of any wings 202, 218. This prevents the air downstream of the rearward propulsion units 206 flowing around any wings 202, 218, and therefore the air downstream of the rearward propulsion units 206 produces substantially no lift. Furthermore, the air flow from the rearward propulsion units 206 is unobstructed by any other part of the aircraft 200. In other words, the aircraft 200 is configured such that no surfaces are provided downstream of the at least one rearward propulsion unit 206.

The rearward propulsion units 206 are preferably mounted symmetrically about the longitudinal and vertical axes of the aircraft 200, such that a net torque is not produced by the activation of the rearward propulsion units 206, which would cause the aircraft 200 to rotate. The elongate members 210 extending from the lateral outer ends of the wings 202 may be profiled to provide improved aerodynamic performance.

The forward and rearward propulsion units 204, 206 may be fixed in position such that the forward propulsion units 204 and the rearward propulsion units 206 are able to provide only forward or rearward thrust. In the example where the rearward propulsion units 206 are propellers, the rearward propulsion units 206 are able to provide rearward thrust by rotating the propellers in a first rotational direction, or forward thrust when the rotational direction of rotation of the propellers is reversed.

The rearward propulsion units 206 shown in FIG. 4 are each propellers powered by a motor. In other examples of the invention, the rearward propulsion units 206 may be for instance a turboprop, a jet engine, a fan, a rocket or a combination thereof.

A divider 208 is provided on the lateral outer end of each wing 202 between the rearward propulsion unit 206 mounted to the respective wing 202 and the forward propulsion units 204 mounted to the respective wing 202. The divider 208 extends outwardly from the wing 202 in both directions in the vertical axis. The divider 208 may be in the form of a generally upstanding panel. The divider 208 provides a barrier between the airflows created by the forward 204 and rearward 206 propulsion units, to ensure that there is no interference between the airflows of the forward 204 and rearward 206 propulsion units. The divider 208 at the lateral outer end of the wing 202 also lowers induced drag caused by wingtip vortices.

Provided at the rear longitudinal end of the fuselage 201 is a tail wing 218, which tail wing 218 may have an aerofoil profile. A tail propulsion unit 216 is mounted to the fuselage 201 in front of the tail wing, such that the airflow from the tail propulsion unit 216 flows around the tail wing 218 to provide a forward thrust. It is to be understood that the forward thrust provided by tail propulsion unit 216 referred to herein refers to the forward thrust provided by the tail propulsion unit 216 once the airflow from the tail propulsion unit 216 has passed the tail wing 218, i.e. once the tail wing 218 has diverted the airflow from the tail propulsion unit 216 to provide lift or downforce and the forward thrust.

The trailing edge of the tail wing 218 includes one or more trailing edge flaps 220, which have a selectively adjustable inclination. The inclination of these trailing edge flaps 220 can alter the amount of downforce or lift provided by the tail wing 218. The lift or downforce provided by the airflow from the tail propulsion unit 216 flowing around the tail wing 218 causes a moment about the lateral axis of the aircraft 200, and therefore provides additional control over the pitch of the aircraft 200 even during vertical take-off or landing.

A vertical stabiliser 222 is also mounted at the rear of the fuselage 201 to provide directional stability.

When taking off, the forward 204 and rearward 206 propulsion units are activated, to provide both forward and rearward thrust respectively. The forward direction is defined by the side of the wings 202 with the leading edge, and the rearward direction is defined by the side of the wings 202 with the trailing edge. The airflow generated by the forward propulsion units 204 flows around the wings 202 to provide lift for taking off. The rearward propulsion units 206 act to counter the forward propulsion provided by the forward propulsion units 204 and the tail propulsion unit 216, which reduces the net forward thrust acting on the aircraft 200. In some embodiments, the thrust provided by the rearward propulsion units 206 matches the forward propulsion provided by the forward propulsion units 204 and the tail propulsion units 216, such that there is a net zero force acting on the aircraft 200 in a longitudinal direction. This enables the aircraft 200 to take off vertically.

When taking off, the leading edge slats 214 and/or the trailing edge flaps 212 on the wings 202 may be deployed to provide additional lift, and may be adjusted to control the yaw of the aircraft 200. The trailing edge flaps 220 on the tail wing 218 of the aircraft 200 may be raised or lowered to control the pitch of the aircraft 200. The rearward propulsion unit 206 on one wing 202 may provide more rearward thrust than the rearward propulsion unit 206 on the other wing 202 to adjust the yaw of the aircraft 200.

Once the aircraft 200 is no longer in contact with the ground, the thrust provided by the rearward propulsion units 206 can be reduced or reversed. This increases the net forward thrust acting on the aircraft 200, and thus the aircraft 200 accelerates in a forward longitudinal direction. In addition, the leading edge slats 214 and/or the trailing edge flaps 212 may be retracted to reduce the drag on the aircraft 200 when moving forward.

In some embodiments, the rearward propulsion units 206 may be rotatably mounted on the aircraft 200. Once airborne, these rearward propulsion units 206 can be rotated 180 degrees about the lateral axis of the aircraft 200 to a forward direction to provide additional forward thrust.

When preparing to land the aircraft 200, the rearward thrust provided by the rearward propulsion units 206 may be increased to reduce the forward longitudinal velocity of the aircraft 200. The thrust from the forward propulsion units 204 may be increased to retain a steady airflow around the wings 202 as the aircraft 200 slows, thereby maintaining the amount of lift force acting on the aircraft 200. The leading edge slats 214 and/or the trailing edge flaps 202 may also be deployed to provide additional lift and increase the drag acting on the aircraft 200. In some embodiments, the longitudinal velocity of the aircraft 200 may be reduced to zero so that the aircraft 200 may land vertically.

When landing the aircraft 200, the forward thrust provided by the forward propulsion units 204 can be reduced, which slows the airflow around the wings 202, thereby reducing the lift acting on the aircraft 200 and initiating downwards motion.

Figure 6:
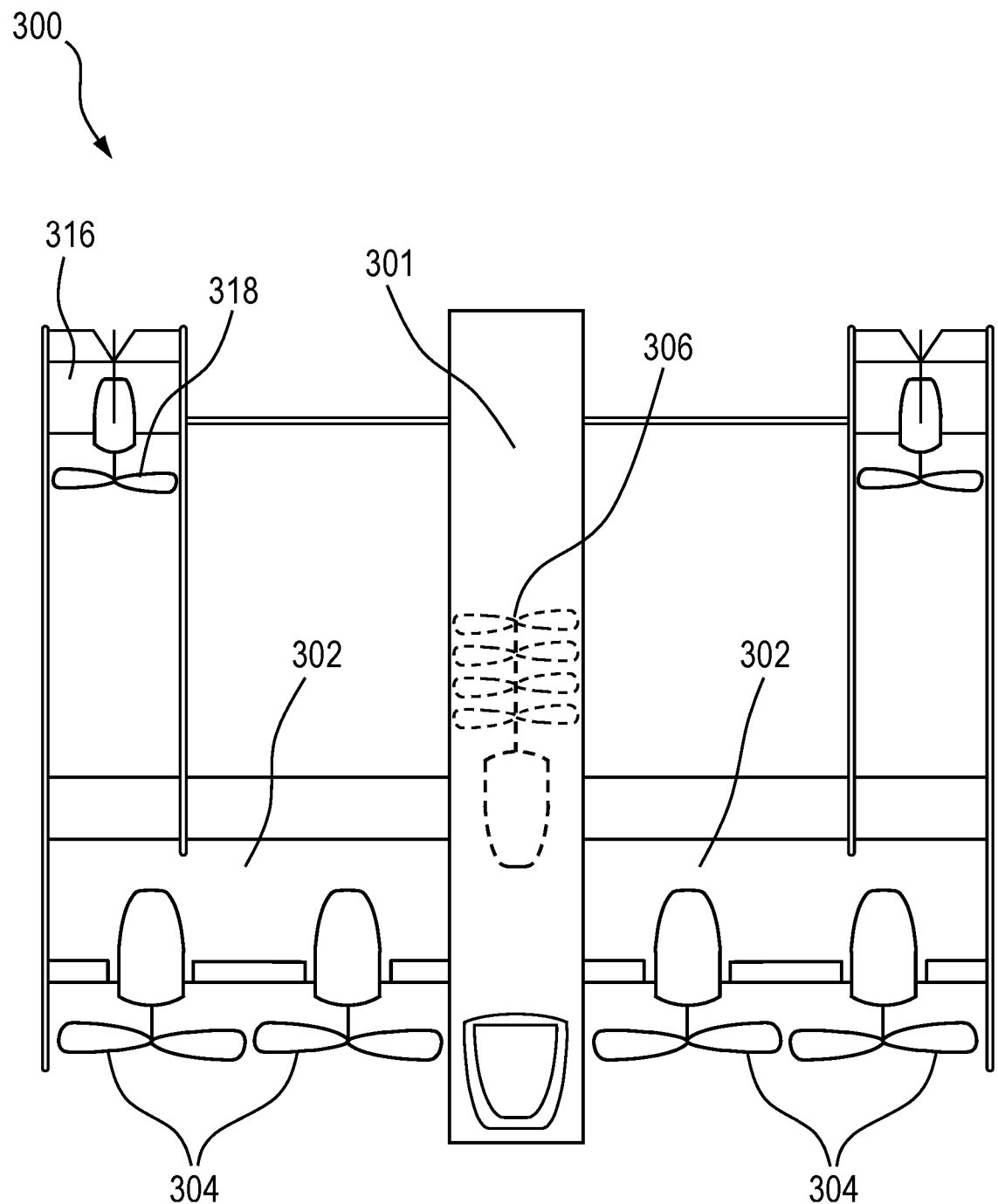
FIG. 6 is a diagrammatic plan view of a third aircraft according to the invention, with objects hidden from view shown in broken lines.
Figure 7:
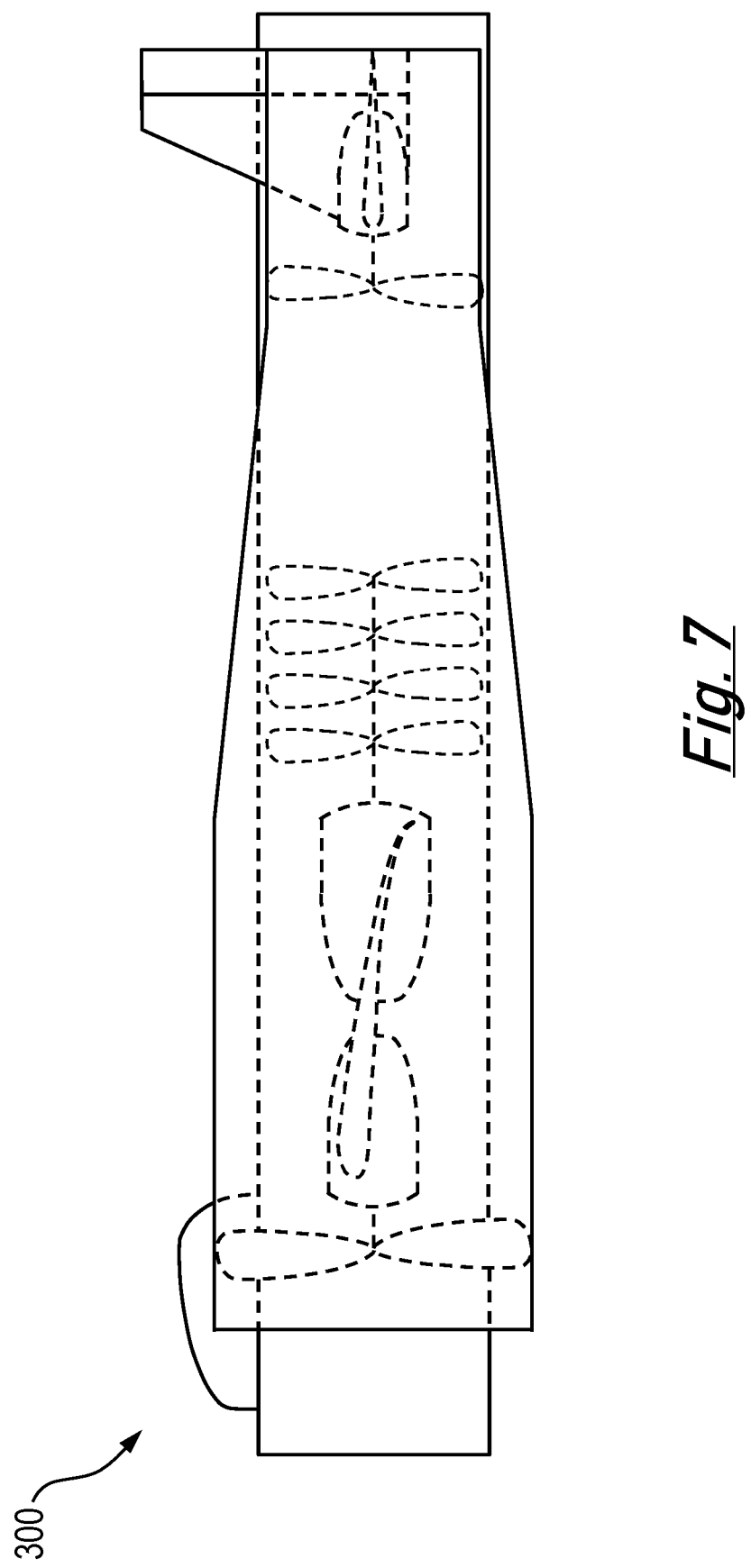
FIG. 7 is a diagrammatic side view of the aircraft of FIG. 6, with objects hidden from view shown in broken lines.
Figure 8:
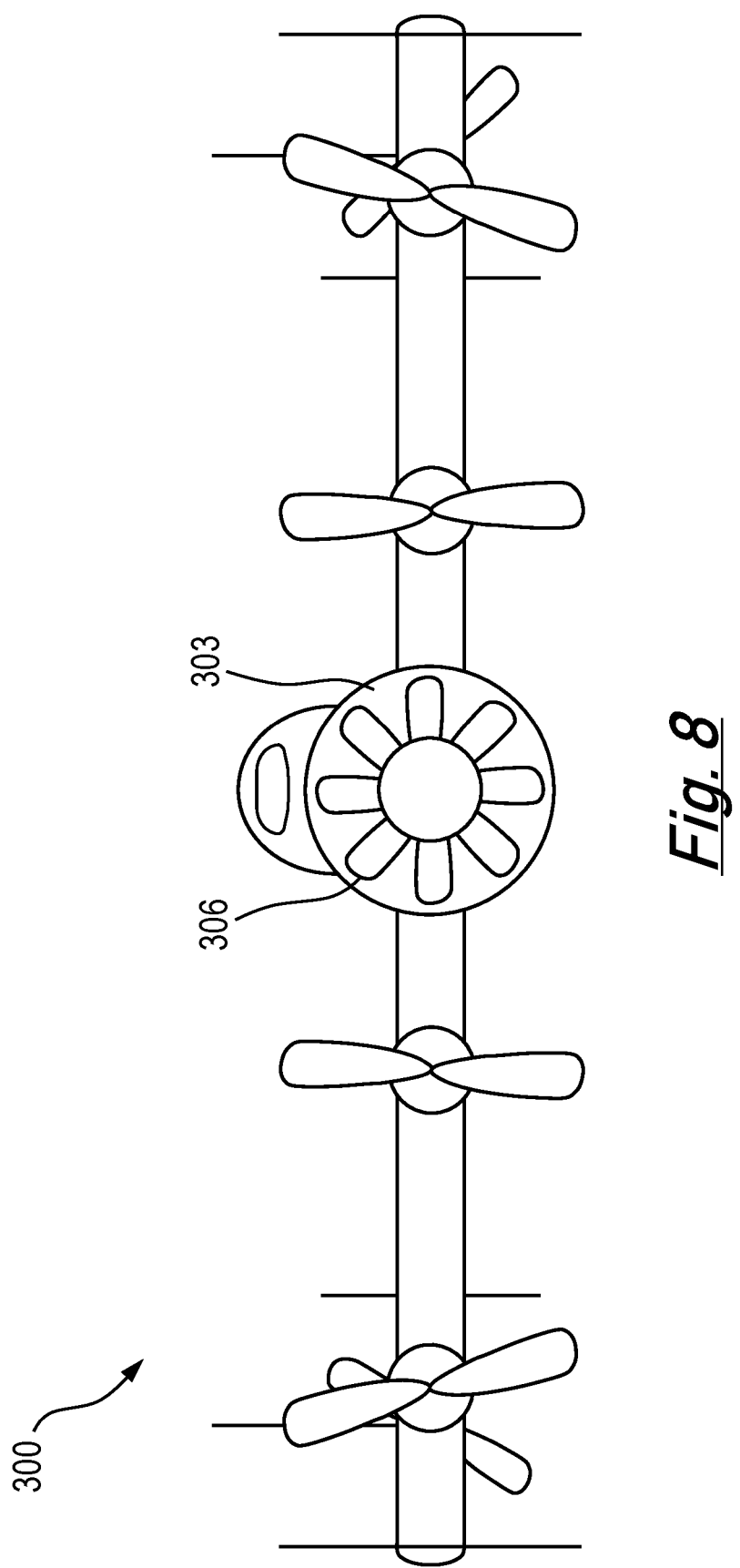
FIG. 8 is a diagrammatic front view of the aircraft of FIG. 6.

FIGS. 6 to 8 show a third aircraft 300 according to the invention. This aircraft is similar to the aircraft 200 of FIGS. 4 & 5, however does not include two rearward propulsion units at the lateral outer ends of each wing 302, but rather includes a rearward propulsion unit 306 positioned in a channel 303 in the fuselage 301 of the aircraft 300. In this example, the rearward propulsion unit 306 is spaced from the leading edge of any wings 302, 316, This prevents the air downstream of the rearward propulsion unit 306 flowing around any wings 302, 316, and therefore the air downstream of the rearward propulsion unit 306 produces substantially no lift.

In some embodiments of the invention, the rearward propulsion unit 306 may comprise multiple propellers in series in the channel 303, or multiple separate rearward propulsion units may be included. Further, rather than the single tail propulsion unit and tail wing of the aircraft 200 of FIGS. 4 & 5, the aircraft 300 of FIGS. 6 to 8 includes a pair of tail wings 316 and tail propulsion units 318, each mounted behind the lateral outer end of a respective wing 302.

The fuselage 301 of the aircraft therefore is a divider between the airflows from the forward propulsion units 304 and the rearward propulsion unit 306, providing a physical separation between the opposing airflows. This ensures that the airflow from the forward propulsion units 304 flows from the leading edge of the wing 302 to the trailing edge, thus increasing the lift provided by the airflow around the wing 302.

In some, but not necessarily all embodiments, at least one rearward propulsion unit 306 is provided positioned in a channel 303 in the fuselage 301 of the aircraft 300 as described above, and at least one additional rearward propulsion unit 306 (not shown) may also be provided at the lateral outer end of each wing 302. This enables greater rotational control of the aircraft about the vertical axis through the centre of gravity of the aircraft, when hovering.

Figure 9:
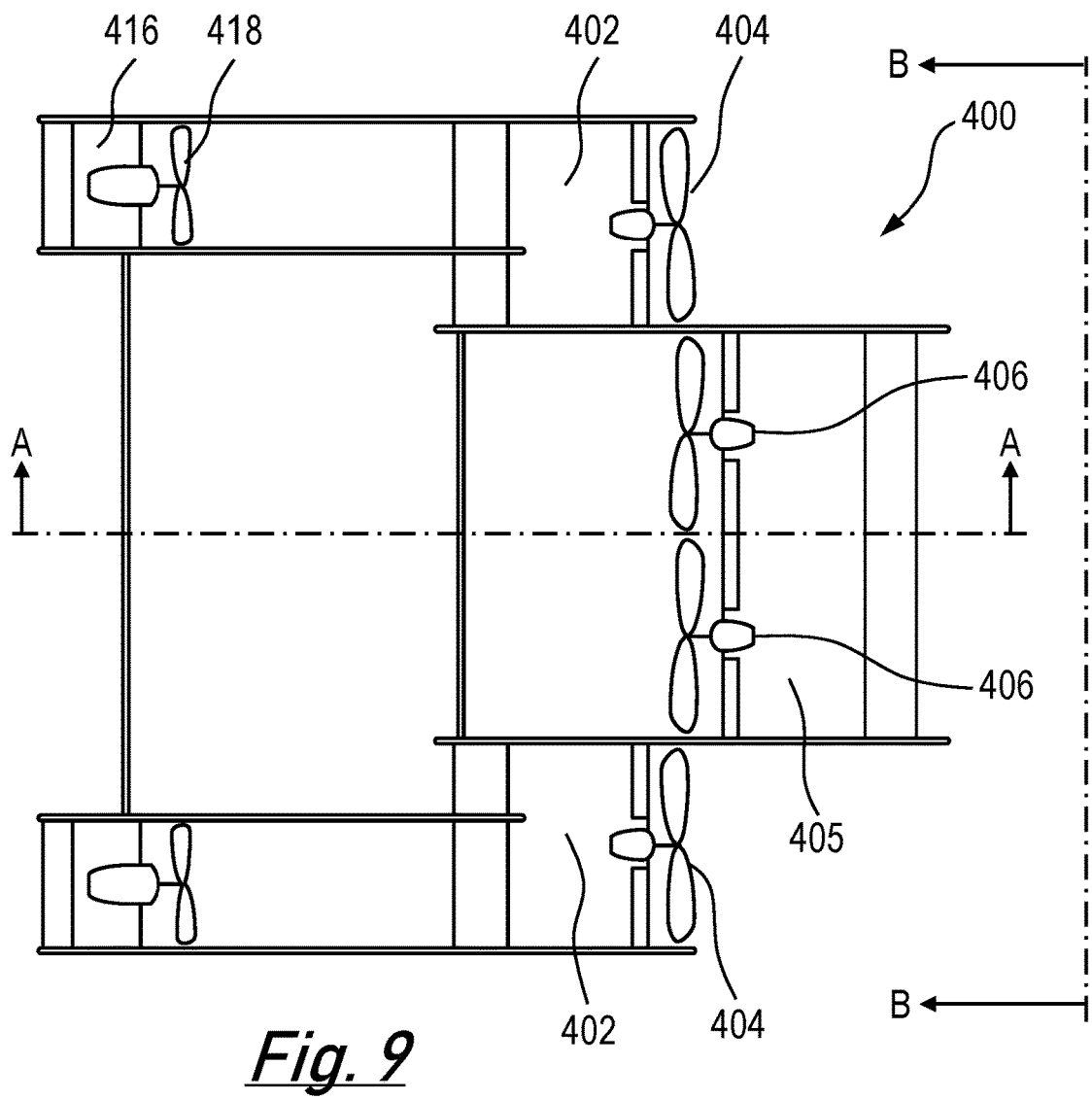
FIG. 9 is a diagrammatic plan view of a fourth aircraft according to the invention.
Figure 10:
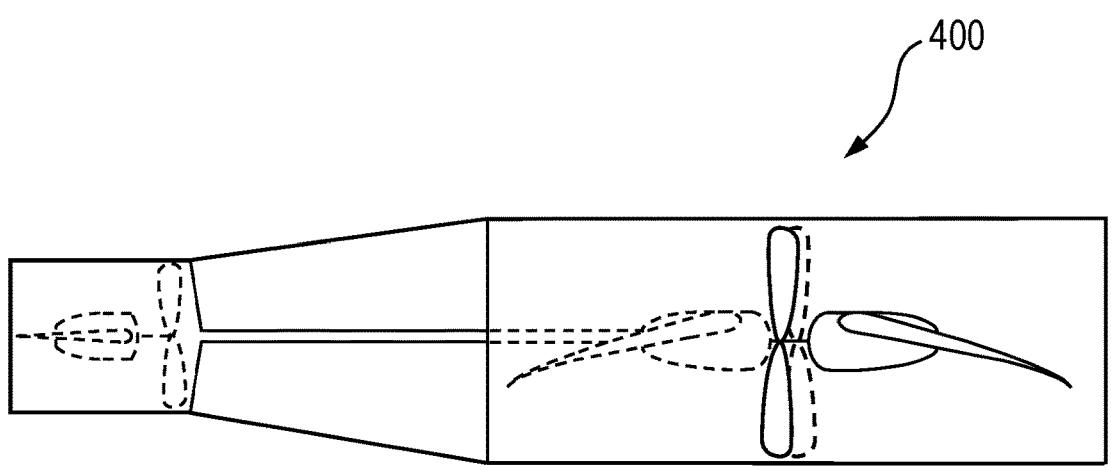
FIG. 10 is a cross-sectional view along line A-A of the aircraft of FIG. 9, with objects hidden from view shown in broken lines.
Figure 11:
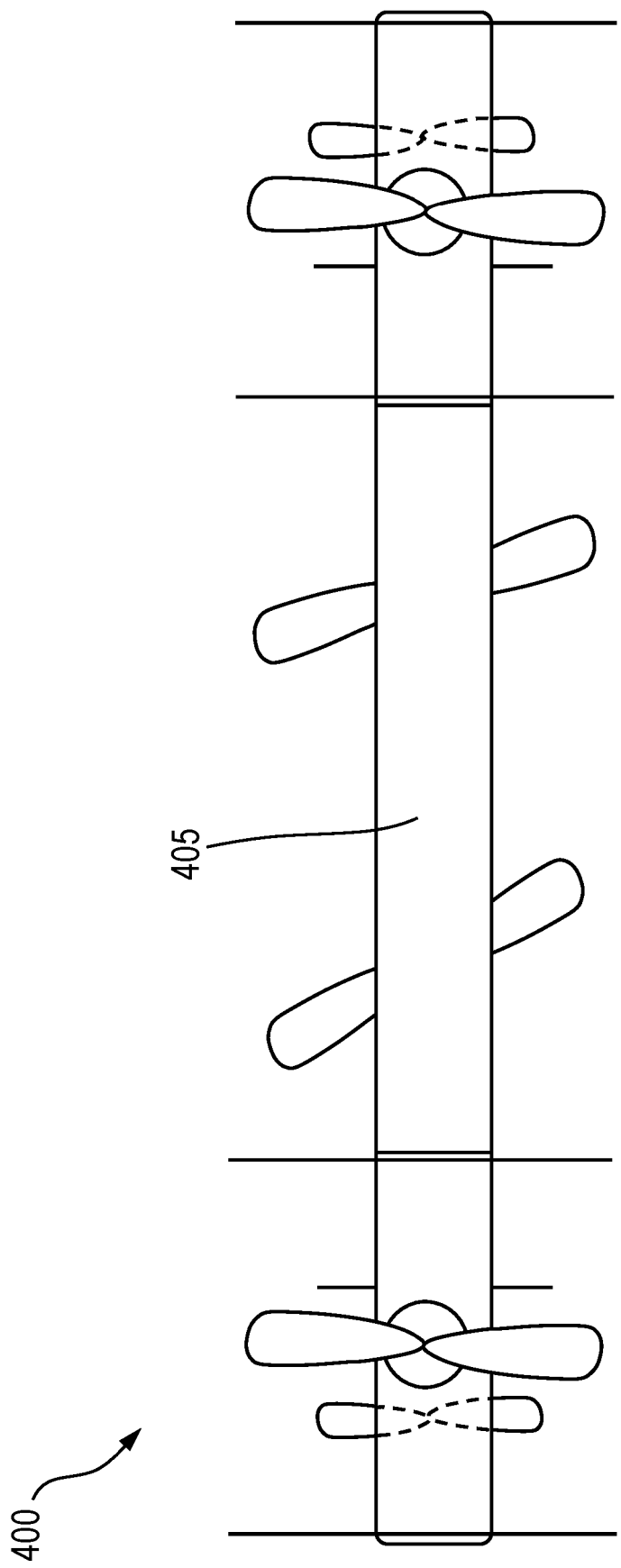
FIG. 11 is diagrammatic view along line B-B of the aircraft of FIG. 9, with objects hidden from view shown in broken lines.

FIGS. 9 to 11 show a fourth aircraft 400 according to the invention. This aircraft 400 includes two tail propulsion units 418 and two tail wings 416, two forward propulsion units 404, each mounted to a respective wing 402 and two rearward propulsion units 406.

A rearward wing 405 is mounted in front of the rearward propulsion units 406, such that the air downstream of the rearward propulsion units 406 flows around the rearward wing 405 when the rearward propulsion units 406 are providing rearward longitudinal thrust, i.e. the leading edge of the rearward wing 405 faces in an opposite direction to the wings 402. The rearward wing 405 has an aerofoil profile.

The provision of the rearward wing 405 in front of the rearward propulsion units 406 enables the rearward propulsion units 406 to also generate lift, as the air downstream of the rearward propulsion units 406 flows around the rearward wing 405 to provide lift. This additional lift relative to an aircraft without at least one rearward propulsion unit mounted upstream of the leading edge of a rearward wing enables the aircraft 400 to effect vertical take-offs and landings with heavier payloads.

FIGS. 12 to 14 show a fifth aircraft 500 according to the invention. This aircraft 500 is similar to the aircraft 200 of FIGS. 4 & 5, but includes rearward wings 505 mounted in front of the rearward propulsion units 506, such that the air downstream of the rearward propulsion units 506 flows around the rearward wings 505 when the rearward propulsion units 506 are providing rearward longitudinal thrust.

In some, but not necessarily all embodiments, each of the rearward wings 505 may include an adjustable deflection surface at the rear 515 of the rearward wing 505 and an adjustable deflection surface 525 at the front of the rearward wing 505, which deflection surfaces are configured to be selectively lowered to configure the respective rearward wing 505 to produce lift from the prevailing airflow flowing around it. The adjustable deflection surfaces 525 at the front of the rearward wing 505 may be lowered when the aircraft 500 is taking off or landing to increase the lift provided by the airflow from the rearward propulsion units 506 flowing around the rearward wing 505, as shown in FIG. 15. Once the aircraft 500 has taken off, the thrust provided by the rearward propulsion units 506 may be reduced and the adjustable deflection surfaces 525 at the front of the rearward wing 505 may be raised, as shown in FIG. 16.

After raising of the adjustable deflection surfaces at the front of the rearward wing 505, the forward propulsion units 504 may temporarily accelerate to provide additional lift, in order to compensate for the temporary loss of lift provided by the airflow over the rearward wing 505 due to the raising of the adjustable deflection surfaces at the front of the rearward wing 505.

In some embodiments, the thrust provided by the rearward propulsion units 506 may be reversed when airborne, such that the rearward propulsion units 506 provide forward thrust. When the net airflow flowing over the rearward wing is in a rearward direction, as shown in FIG. 17, the adjustable deflection surface at the rear 515 of the rearward wing 505 may be lowered in order to ensure that an upward lift is provided by the rearward wing 505.

FIG. 18 shows a sixth aircraft 600 according to the invention. This aircraft 600 is similar to the aircraft 200 of FIGS. 4 & 5, but includes a single forward propulsion unit 604 mounted to the front of the fuselage 601. The diameter of the forward propulsion unit 604 is substantially equal to the wingspan of both of the wings 602 to maximise the lift generated.

Furthermore, each of the forward propulsion unit 604 and the tail propulsion unit 616 include a further contra-rotating propeller or fan configured to rotate about the same axis as the first propeller or fan, but also configured to rotate in the opposite direction to the first propeller or fan. The first propeller or fan alone provides a non-uniform airflow with a rotational component, which reduces the lift provided by the airflow around the respective wing 602, 618. The contra-rotating propeller or fan can reduce or remove this rotational component of the airflow around the respective wing 602, 618, and therefore increase the lift generated.

The two rearward propulsion units 606 are in the form of propellers, but could be for instance turboprops, jet engines, fans or rockets. The rearward propulsion units 606 do not include a contrarotating propeller or fan.

There is thus described a fixed-wing aircraft capable of vertical and/or short take-off and landing with a number of advantages. The aircraft is of relatively simple construction and does not require rotatable propulsion units to transition between vertical or short take-off and horizontal flight. Propulsion units configured to provide vertical thrust, such as vertical fans or vertically mounted exhaust nozzles are not required, which further reduces the complexity and cost of the aircraft. The wings are not required to rotate, which again simplifies the design relative to prior V/STOL aircraft that include rotatable wing designs.

A V/STOL aircraft according to the invention utilises the lift provided by airflow around the wings during vertical take-off, and thus the aircraft can transition from vertical flight to horizontal flight with relative simplicity, without the need for rotating propulsion units or vertical fans. In many embodiments, where the air flow from the rearward propulsion units does not flow over any wings, the thrust of the rearward propulsion units can simply be reduced or reversed to transition from vertical to horizontal flight. This reduction or reversing of the thrust of the rearward propulsion units does not alter the lift force acting on the aircraft or the centre of lift of the aircraft, and no additional power is required from the forward propulsion units. Therefore during hovering, the position of the aircraft in the horizontal plane can be altered by simply varying the rearward thrust from the rearward propulsion units.

For the fifth aircraft 500 of FIGS. 12-19, the thrust provided by the forward propulsion units 504 may temporarily be increased to provide additional lift when the rearward propulsion units transition from providing rearward to forward thrust.

Prior arrangements often require a delicate transition between vertical/short take-off and horizontal flight, as the thrust and orientation of the propulsion units must be carefully managed to prevent loss of control of the aircraft. All of the lift required in all modes of flight, such as forward flight, hover, vertical take-offs and vertical landings may be generated by lift resulting from the airflow around the fixed-wings of a VTOL aircraft according to the invention.

Various other modifications may be made without departing from the scope of the invention. For instance, different types of propulsion units may be used, a different number of propulsion units may be used, or the propulsion units may be positioned differently on the aircraft. Different wing configurations and numbers of wings may be used, which may include for instance delta wings. Propulsion units configured to provide vertical thrust such as vertical fans or vertically mounted exhaust units may be utilised to provide additional lift, or be used to assist in orienting the aircraft. The aircraft may vary in size from that of for instance a small model aircraft or small drone, to at least the size of a large transport aircraft.

Features described in the preceding description may be used in combinations other than the combinations explicitly described.

Although features have been described with reference to certain examples, those features may also be present in other examples whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A fixed-wing aircraft comprising:
    at least one propulsion unit configured to propel the aircraft in a first direction;
    at least one further propulsion unit configured to propel the aircraft in a second direction substantially opposite to the first direction; and
    at least one wing,
    wherein the at least one propulsion unit is mounted in a fixed position in front of a leading edge of the at least one wing, such that air downstream of the at least one propulsion unit flows around the at least one wing to provide lift and a longitudinal thrust in the first direction, and the at least one further propulsion unit is mounted in a fixed position to provide a longitudinal thrust in the second direction that opposes the longitudinal thrust in the first direction, wherein the lift provided by the at least one propulsion unit causes the aircraft to take off.

2. The aircraft according to claim 1, in which a chord of the at least one wing at a first point along a length of the at least one wing is substantially parallel to a chord of the at least one wing at all other points along the length of the at least one wing.

3. The aircraft according to claim 1, in which the at least one further propulsion unit is mounted to a lateral outer end of the at least one wing.

4. The aircraft according to claim 1, in which the aircraft further comprises at least one further wing, wherein the at least one further wing is a fixed wing, the at least one further wing being mounted in the first direction relative to the at least one further propulsion unit, such that the air downstream of the at least one further propulsion unit flows around the at least one further wing to generate lift, when the at least one further propulsion unit is providing a longitudinal thrust in the second direction.

5. The aircraft according to claim 4, in which the at least one further wing includes an adjustable deflection surface at a furthermost part of the at least one further wing in the first direction and an adjustable deflection surface at the furthermost part of the at least one further wing in the second direction, which are configured to be selectively lowered in order to configure the at least one further wing to produce lift from a prevailing airflow flowing around the at least one further wing.

6. The aircraft according to claim 1, in which the aircraft is configured such that the at least one further propulsion unit is spaced from the leading edge of any wings, to prevent the air downstream of the at least one further propulsion unit flowing around any wings, and thereby the air downstream of the at least one further propulsion unit produces substantially no lift.

7. The aircraft according to claim 1, in which the at least one propulsion unit includes a propeller or fan and a contra-rotating propeller or fan configured to rotate about a same axis as the propeller or fan but in an opposite direction to the propeller or fan.

8. The aircraft according to claim 7, in which the at least one further propulsion unit does not include a contra-rotating propeller or fan.

9. The aircraft according to claim 1, in which the at least one further propulsion unit includes a propeller or fan and a contra-rotating propeller or fan configured to rotate about a same axis as the propeller or fan but in an opposite direction to the propeller or fan.

10. The aircraft according to claim 1, in which the aircraft includes a divider to separate airflows from the at least one propulsion unit and the at least one further propulsion unit.

11. The aircraft according to claim 10, in which the divider is a generally upstanding panel which is provided on the at least one wing between the at least one propulsion unit and the at least one further propulsion unit to separate the airflows from the respective propulsion units.

12. The aircraft according to claim 1, in which the aircraft is configured to provide reduced or zero thrust from the at least one further propulsion unit once airborne.

13. The aircraft according to claim 1, in which the aircraft comprises an elongate fuselage and two wings, with a wing extending from each side of the fuselage, and wherein a length dimension of the fuselage defines a longitudinal axis.

14. The aircraft according claim 13, in which the at least one further propulsion unit is provided within a channel in the fuselage.

15. The aircraft according to claim 14, in which an additional further propulsion unit is provided at a lateral outer end of each of the two wings.

16. The aircraft according to claim 1, in which the aircraft includes at least one tail wing mounted at a furthermost part of the aircraft in the second direction and at least one tail propulsion unit mounted in front of the leading edge of the at least one tail wing, such that the air downstream of the at least one tail propulsion unit flows around the at least one tail wing to provide lift or downforce and a thrust in a first direction.

17. The aircraft according to claim 16, in which the at least one tail wing includes at least one adjustable flap mounted on a trailing edge of the at least one tail wing, which flap is adjustable such that an amount of lift or downforce caused by the air flow from the at least one tail propulsion unit can be adjusted.

18. A method of controlling an aircraft according to claim 1, the method comprising:
    activating the at least one propulsion unit, such that an airflow from the at least one propulsion unit flows around the at least one wing to provide lift and a longitudinal thrust in the first direction;
    activating the at least one further propulsion unit to provide a longitudinal thrust in the second direction that opposes the longitudinal thrust in the first direction provided by the at least one propulsion unit; and
    taking off using the lift, such that the aircraft is no longer in contact with the ground.

19. The method according to claim 18, in which the method further comprises:

once the aircraft is no longer in contact with the ground, reducing the thrust provided by the at least one further propulsion unit.

20. A method of landing an aircraft according to claim 1, the method comprising:
increasing the longitudinal thrust provided by the at least one further propulsion unit in the second direction, such that a longitudinal velocity of the aircraft in a first direction decreases;
whilst the longitudinal velocity of the aircraft in the first direction decreases, increasing the longitudinal thrust in the first direction provided by the at least one propulsion unit, such that a steady airflow is maintained around the at least one wing; and
once the longitudinal velocity of the aircraft in the first direction has been reduced, decreasing the longitudinal thrust in the first direction provided by the at least one propulsion unit, such that an amount of lift generated by the aircraft is reduced, thereby causing the aircraft to descend.

* * * * *